Sept. 11, 1951   J. A. HANNUM ET AL   2,567,706
MOISTURE-DESTRUCTIBLE CONTAINER
Filed Jan. 9, 1946

INVENTORS.
JOHN A. HANNUM
AND
JOSEPH N. EPEL
BY
Bosworth & Sessions
ATTORNEYS.

UNITED STATES PATENT OFFICE 2,567,706

MOISTURE-DESTRUCTIBLE CONTAINER

John A. Hannum and Joseph N. Epel, Detroit, Mich., assignors to Hefco Laboratories, Detroit, Mich., a partnership consisting of Joseph N. Epel, Morris Frumin, and John A. Hannum Application January 9, 1946, Serial No. 640,013

1 Claim. (Cl. 229—3.5)

This invention relates to a container for holding material with a high moisture content until such time as it is desired to discard the container by causing its disintegration from about the material therein. More specifically the invention is directed to a container that may be used by nurseries and the like in starting young plants that are thereafter placed in the ground to continue their growth.

Containers such as the ordinary clay pot find wide use in horticulture where seeds may be started under glass and cared for and protected from the elements during their early growth after which they are transferred to the earth outdoors when they are sufficiently sturdy to withstand the elements. One disadvantage to starting plants in this manner has arisen at the time of transplanting when the root systems were disturbed as the plants were removed from the container. Attempts have been made to solve this problem by the use of containers made from molded fertilizer in which the plant remained after transplanting but such containers have been subject to moisture deterioration, relatively high cost of manufacture and to disintegration by the plant roots themselves when they are sturdy enough, but perhaps not yet ready for transplanting.

It is an object of this invention to provide an improved container for the uses outlined above. A general object of the invention is to provide a container with an interior wall portion that is highly water impervious and an exterior portion that readily absorbs moisture with resultant disintegration of the container. A further object of the invention is to provide a container whose interior surface embodies a highly water impervious coating that is at the same time frangible when the material to which it is applied breaks down or disintegrates. Another object of the invention is to provide a container with a wall portion made of stock that is highly water absorptive and with negligible wet strength, which material is coated on the inner container surface with a frangible and extremely water impervious covering.

Other objects of the invention will become apparent from the specification when read with reference to the accompanying drawing. The novel features of the invention are summarized in the claims.

Figure 1:
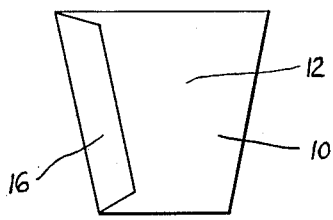
Figure 2:
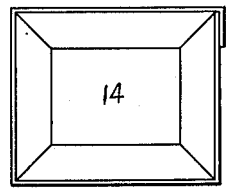
Figure 3:
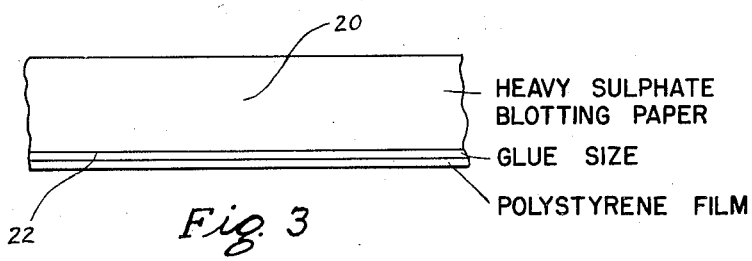
Figure 4:
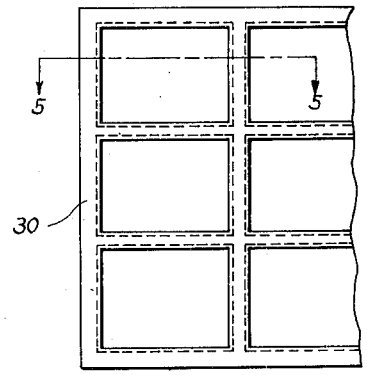
Figure 6:
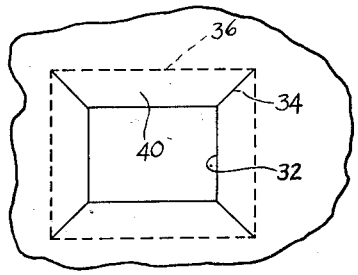
Figure 5:
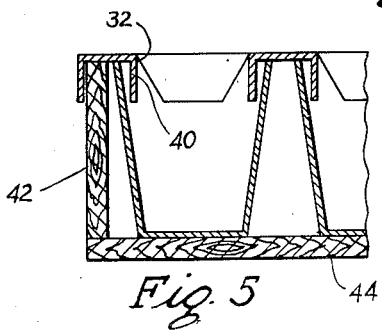

In the annexed drawings: Figure 1 is a side elevation of a container embodying the present invention; Figure 2 is a plan view of the container shown in Figure 1; Figure 3 is a detail showing the wall construction in cross section; Figure 4 is a plan view, partially broken away, of a plurality of containers surmounted by a protecting grid; Figure 5 is a section through Figure 4 as indicated by the lines 5—5 thereon; and Figure 6 illustrates the manner in which a sheet is cut to form a grid.

Although the container of the present invention is described for use in horticulture, and particularly as a substitute for clay pots and the like, it will be understood that it may be used wherever its characteristics serve a useful purpose. The specific shape of the container is not an essential part of this invention and it is contemplated that containers of other shapes than shown herein may be made within the scope thereof. In the following description and in the claims the word "wall" is to be construed to apply to any part of the container and particularly to either the side walls or the bottom walls.

Referring now to Figure 1, a container in accordance with the present invention is indicated at 10 and is built up of sheet material with suitable folds to result in the shape shown in Figures 1 and 2. The manner in which the sheet is cut out will not be described in detail because such is well known to a person skilled in the container art. As shown in the figures referred to the container 10 has four side walls 12 each of an isosceles trapezoidal shape with the longer of the two parallel sides at the top. Flaps 14 cut in the sheet of stock are folded over each other and secured together to provide that part of the wall which is the bottom. Preferably the flaps each have an area that is substantially that of the entire bottom and by folding them over one on the other a multilayer reinforced bottom is provided. To secure the side walls 12 in position a flap 16 is provided to overlie one edge of an adjoining side wall and be secured thereto. The completed container does not normally have a top although one may be supplied by adding a flap to join a side wall at a fold coincident with an upper edge of the side wall.

A container such as that just described may be formed in a variety of shapes as for instance a cylinder, a cone or a cube. If desired the container may be formed by molding the sheet material over a form corresponding to its inside shape in which case a one piece construction results as distinguished from the folded flap construction.

All or a part of the container wall is formed of a material that is impervious to moisture on the inside and highly water absorptive on the outside. The dry wall also is strong enough to be root resistant so that it is not prematurely pierced by the young roots. In addition the outer wall disintegrates upon the application of water to it and the interior coating, which is frangible, breaks down into small pieces when the outer supporting structure is destroyed. This construction is particularly advantageous in transplanting seedlings and the like into the earth because it is possible effectively to remove the container without any disturbance to the tender root systems of the young plants and at the same time insure that the container will serve its purpose until it is intentionally destroyed.

A wall portion of the type outlined above is illustrated in cross section in Figure 3 on a greatly enlarged scale. The material from which the wall is made comprises a heavy sulphate blotting paper stock that has sufficient weight to afford considerable stiffness when dry. On the other hand its wet strength when subjected to water is negligible and contact with water causes the sheet to break down or disintegrate. This paper stock is indicated at 20 in Figure 3 and the upper edge thereshown corresponds to the outer wall portion of the container. That surface of the stock that is to be on the interior part of the container is indicated at 22 and is covered with a glue size in a manner that is well known in the art. The purpose of this sizing is to minimize penetration of a coating that is applied over it to cover the surface 22. The glue size itself does not appreciably penetrate the stock 20.

There is sprayed or otherwise applied to the glue sized surface 22 of the stock 20 a very thin film of unplasticized polystyrene. This material is very frangible and by itself possesses almost no shear strength. In the present invention it derives its strength from the dry paper stock 20 on which it is coated. It does possess the property of being extremely water impervious and thus prevents moisture within the container from coming in contact with the stock 20.

From the description thus far it will be seen that water applied to one side, at the bottom in Figure 3, of the composite material illustrated will have no effect on it while the application of water to the other side (i. e. the top in Figure 3) will cause the stock 20 rapidly to disintegrate, the glue size to break up and the film 25 to break up when its support is removed.

The application of the polystyrene film preferably is accomplished by spraying the inside of the entire completely assembled container while it is held in an inverted position. In this position there is little likelihood of any of the film being applied to the exterior of the container and thus protecting it from disintegration later. The polystyrene is prepared as a 10% solution in benzene and is sprayed on to the interior wall of the container from a spray nozzle that is inserted therein while the container is held in inverted position. To insure that no pin holes will exist in the coating it is sprayed twice, the second time being after the benzene, with its desirable high evaporation rate, has been removed from the first coating leaving it hard.

When containers constructed in accordance with this invention are used in green houses and the like they often are assembled in groups in flats or other shallow containers. During the time the plants within them are growing it is necessary to spray the earth in the containers to supply moisture to the plants and it is essential that during this operation no water come in contact with the exterior surface of the containers. To protect these surfaces a grid is provided that covers the abutting edges of the adjacent containers in the flat.

Such a grid to protect the containers is illustrated at 30 in Figures 4, 5 and 6. It is made of a sheet of fibre stock that is water impervious and easily cut and bent. This sheet is blanked out as shown in Figure 6 with an opening 32 the corresponds in shape but is considerably smaller in area than the top of the container with which the grid is to be used. The sheet also is cut diagonally as at 34 from the corners of the opening 32 back to a point determined by the fold lines 36 to provide flaps 40 that are bent down along the folds 36 to provide between each pair of openings 32 an inverted channel construction as shown in Figure 5.

The grid thus formed is laid over the upper edges of the containers in the flat and the inverted channels formed in the grid cover any opening between them and so prevent moisture due to sprinkling from above from making contact with the exterior surfaces of the containers. At the outer edge of the flat the inverted channel of the grid lies over the side 42 of the flat 44 as well as the edge of the adjacent container walls. An assembly of containers and a surmounting grid is shown in Figure 4 in plan view.

The grid has been shown formed for use with square topped containers requiring square openings 32; although it is contemplated that the openings 32 can be adapted to fit any shape of container top—as rectangular or round. This may be done by properly locating in position and number the cuts 34 and folds 36.

After the plants in the container have reached a size where they may be transplanted each container is merely placed in a suitable hole in the earth which is then packed firmly about it. The plants are sprinkled after they have been put in the ground and the moisture in the earth outside the container attacks the unprotected exterior surface with its resultant disintegration. The coating 25 is sufficiently thin and brittle so that it breaks up when the supporting wall 20 in destroyed and the plant roots may find their way freely through the region of the container wall and into the outer earth. Due to the fact that the materials from which the container is made exert no harmful affect on plant life the destroyed container is allowed to remain in situ. Accordingly the root system is entirely undisturbed by the transplanting.

From the foregoing description it will be seen that the invention provides a container of particular application to horticulture, but not limited thereto; that possesses unique advantages for the intended purposes; and that permits effective separation of the container from the material within it without disturbing the latter.

We claim:

A moisture-destructible container for bulk material with a high moisture content comprising a wall portion made of a heavy blotting paper stock that has a negligible wet strength, a coating of glue sizing on the inner surface thereof to seal said surface against penetration, and a thin frangible layer of unplasticized polystyrene over said glue sizing to render said inner surface moisture impervious, the outer surface of said wall portion being unprotected, freely accessible to external moisture, and given to ready absorption of external moisture with resulting rapid disintegration of the container.

JOHN A. HANNUM.
JOSEPH N. EPEL.

REFERENCES CITED

The following references are of record in the file of this patent:

UNITED STATES PATENTS

| Number | Name | Date |
|---|---|---|
| 837,977 | Thornton | Dec. 11, 1906 |
| 1,862,565 | Burke et al. | June 14, 1932 |
| 1,938,501 | Shofer | Dec. 5, 1933 |
| 1,965,199 | McAleer | July 3, 1934 |
| 1,993,620 | Otwell | Mar. 5, 1935 |
| 1,998,637 | Radley et al. | Apr. 23, 1935 |
| 2,176,166 | Bowlby et al. | Oct. 17, 1939 |
| 2,333,023 | Manor | Oct. 26, 1943 |
| 2,352,865 | Smith | July 4, 1944 |
| 2,354,824 | Muskat | Aug. 1, 1944 |
| 2,402,605 | Cowen | June 25, 1946 |